United States Patent Office 3,536,879
Patented Oct. 27, 1970

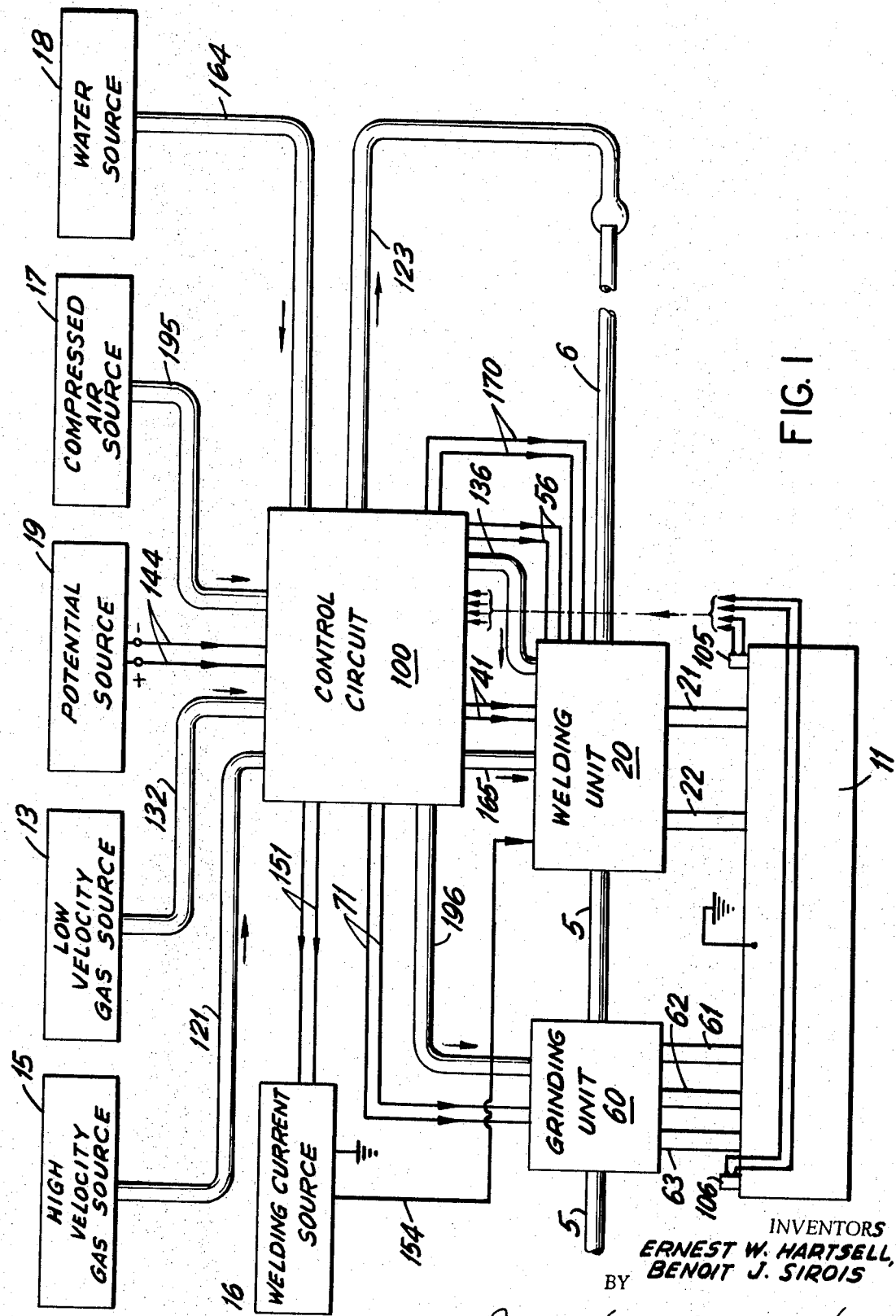

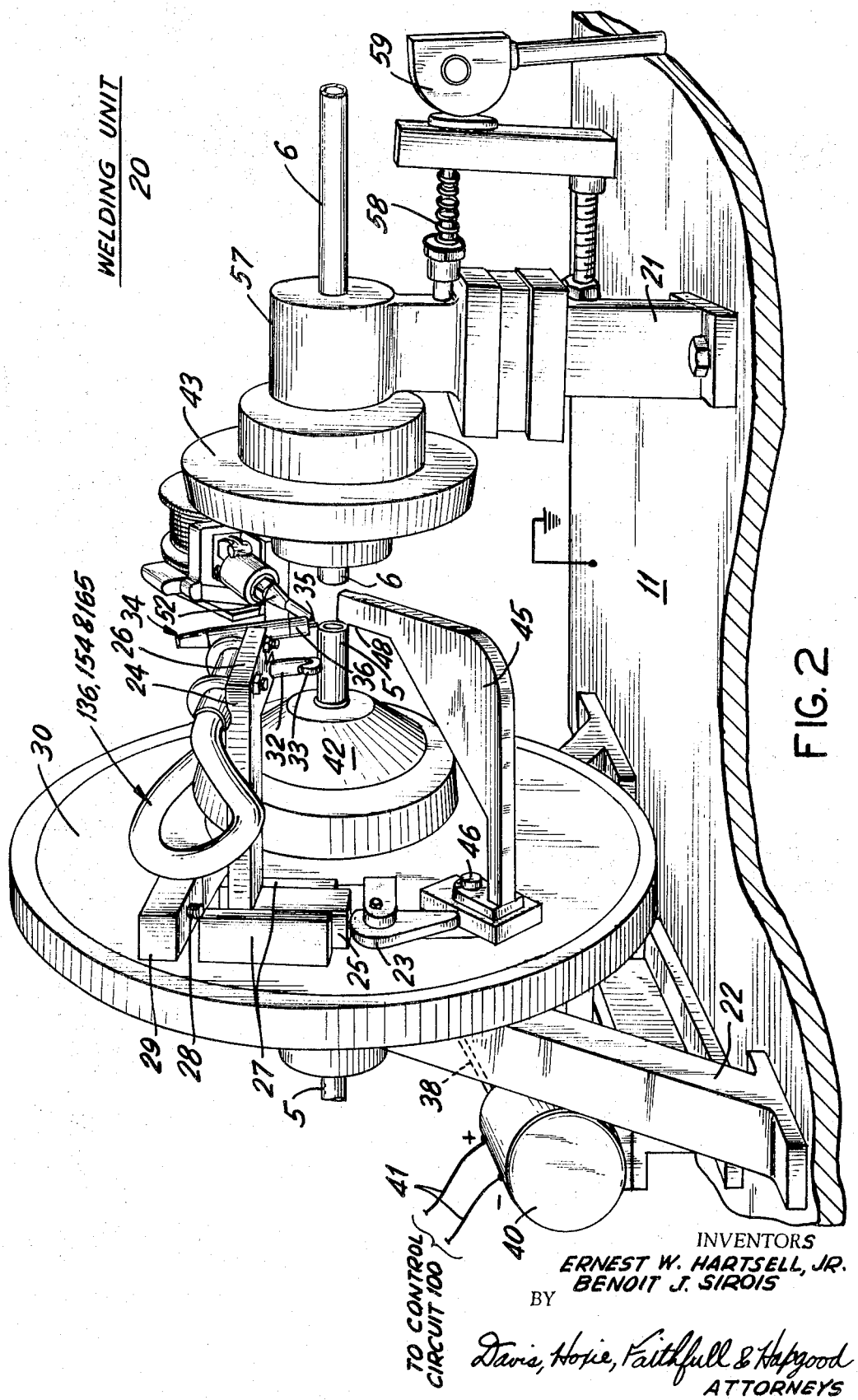

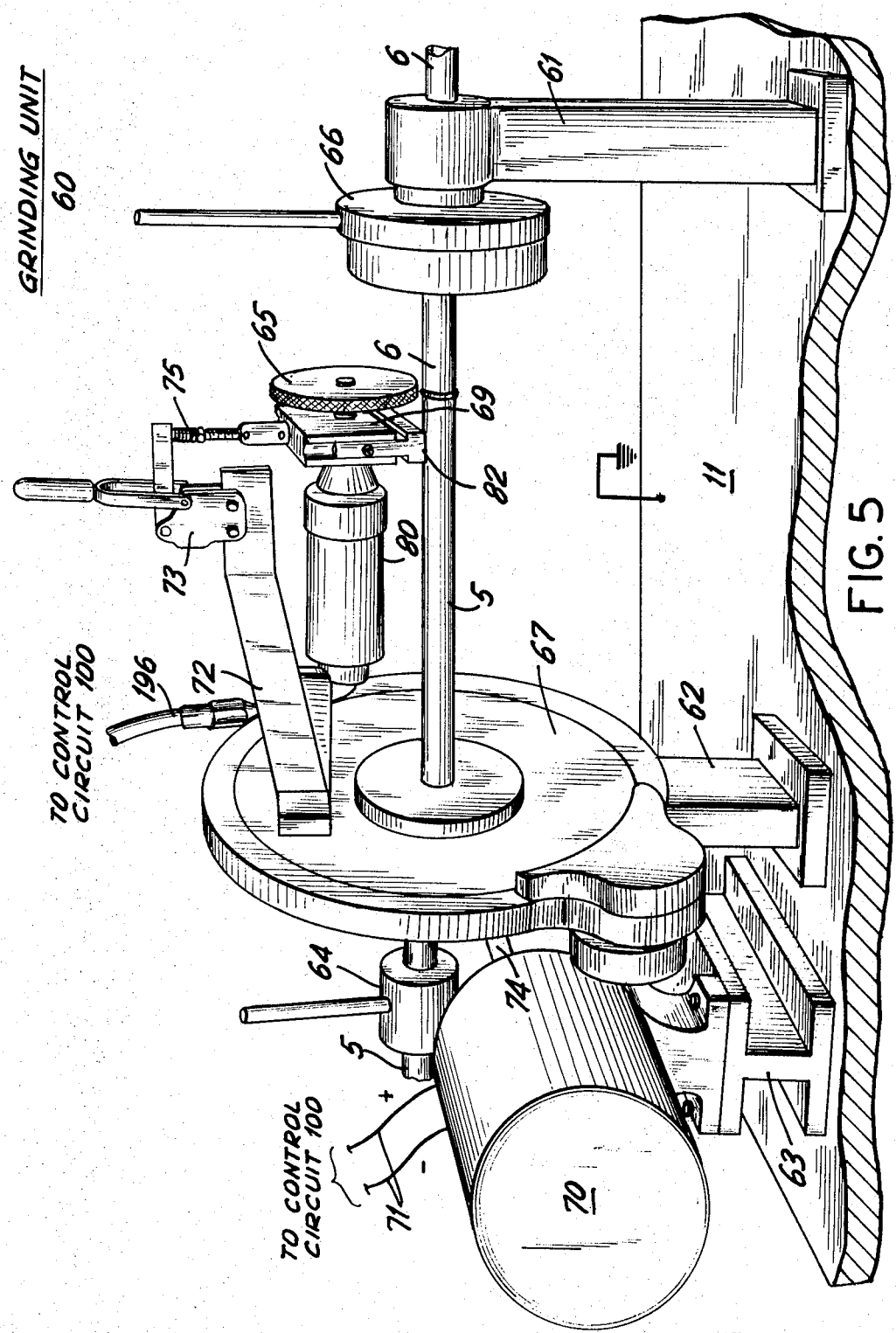

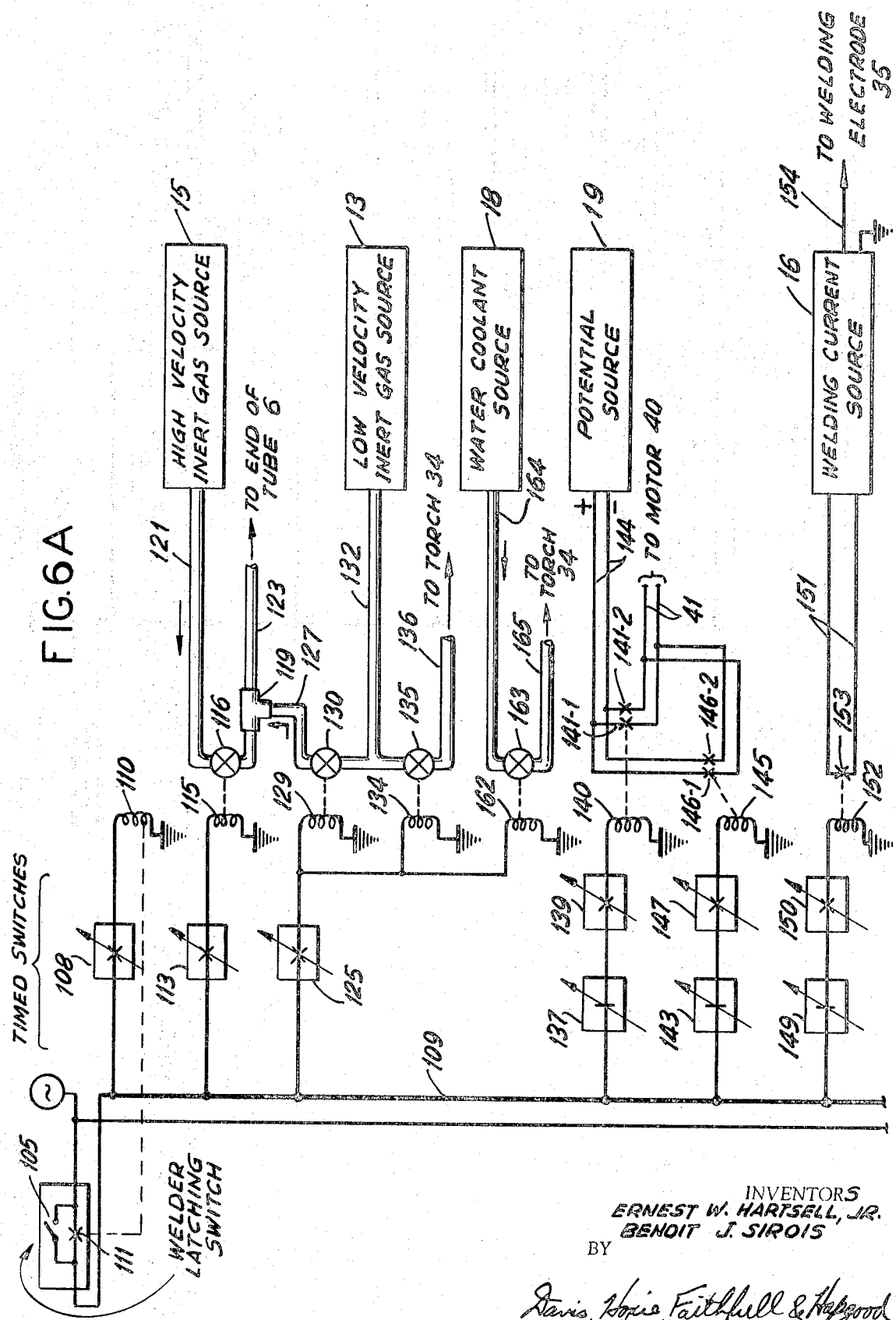

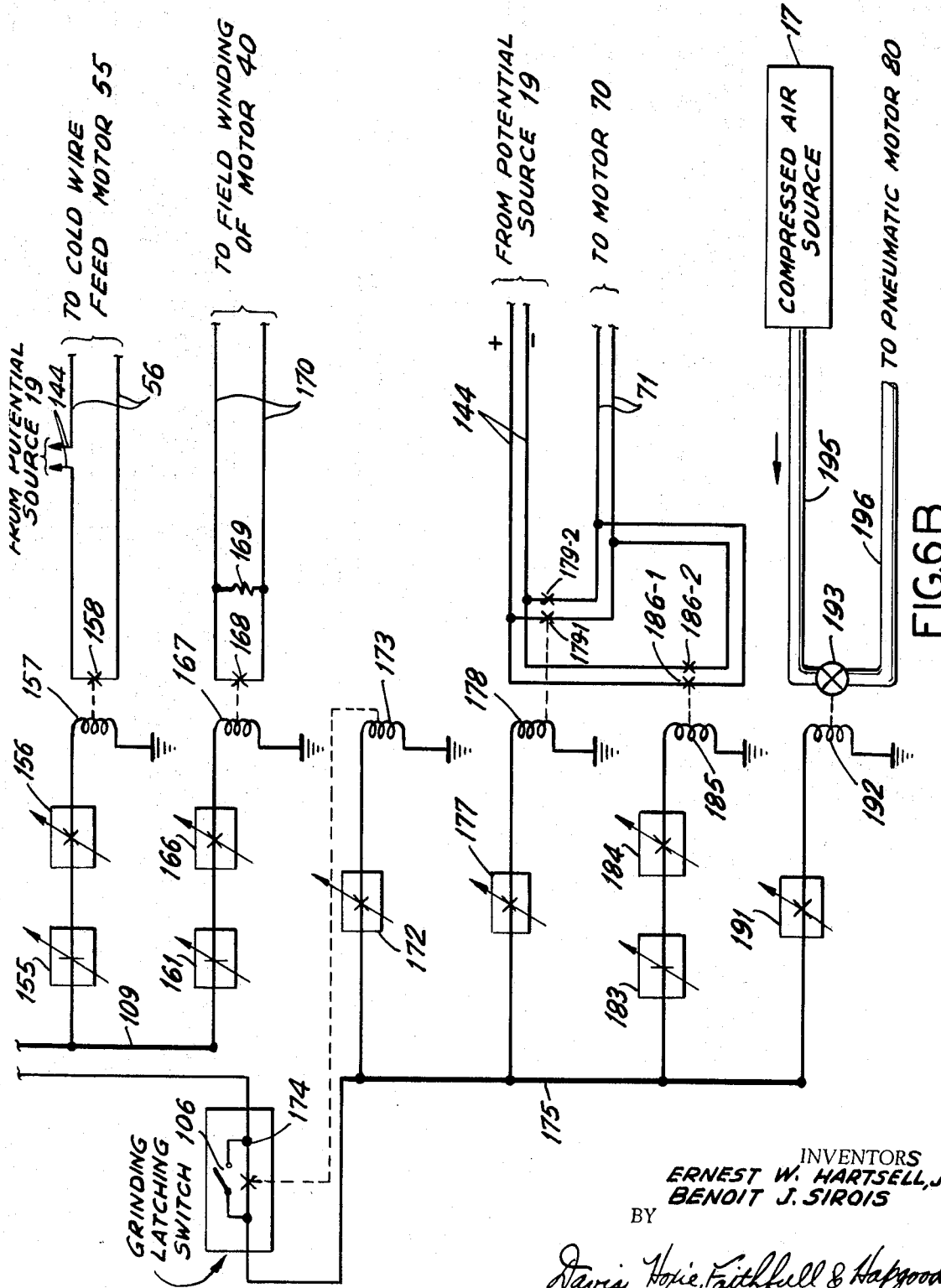

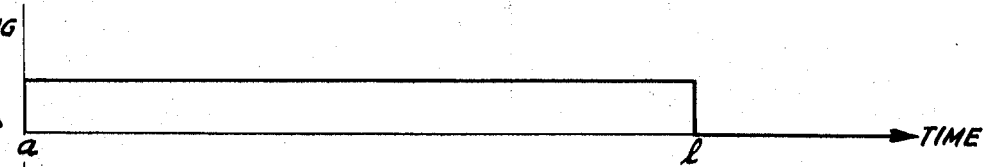
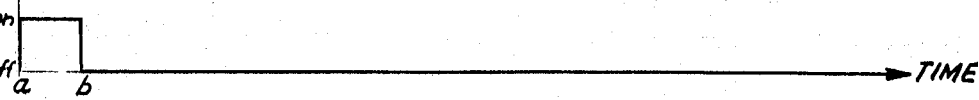
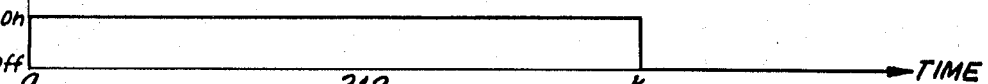
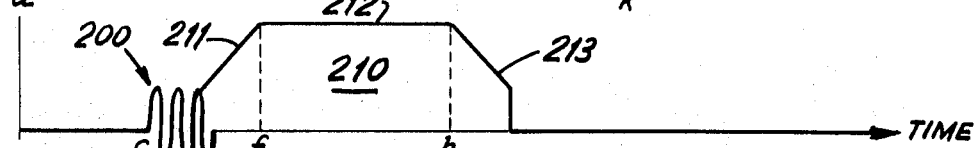
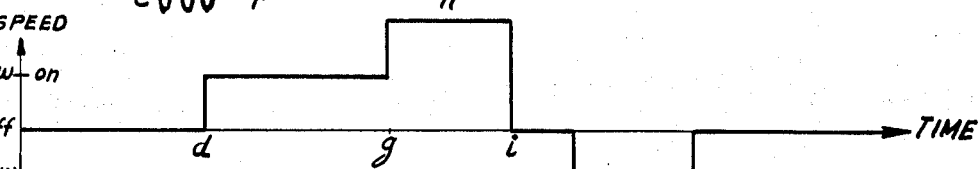
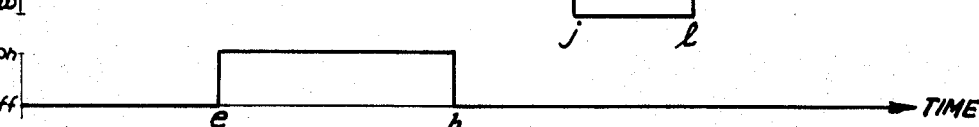
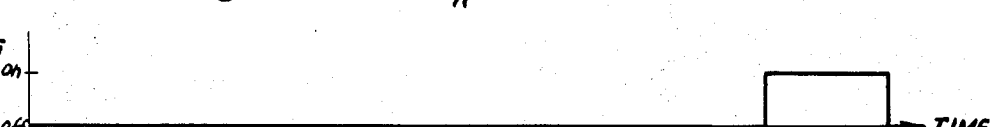

3,536,879
WELDING SYSTEM
Ernest W. Hartsell, Jr., Hightstown, and Benoit J. Sirois, East Brunswick, N.J., assignors to Phelps Dodge Copper Products Corporation, New York, N.Y., a corporation of Delaware
Filed Sept. 12, 1967, Ser. No. 667,172
Int. Cl. B23k 9/02, 11/02
U.S. Cl. 219—60
9 Claims

ABSTRACT OF THE DISCLOSURE

A butt welding and grinding system employs axially aligned orbiting welding and grinding units for joining contiguous metallic tube sections. Long lengths of tubing may advantageously be automatically fabricated by interconnecting such sections with strong nonporous weld joints characterized by a relatively small internal bead, and little or no external bead.

DISCLOSURE OF INVENTION

This invention relates to welding systems and, more specifically, to a system for butt welding lengths of metallic tubes.

Many applications of present day interest require long, continuous lengths of metallic tubes. For example, multistage flash heat exchangers for large desalination plants employ many parallel runs of such tubes in continuous lengths up to approximately three hundred feet. Since tubes of this length cannot be transported economically, a job site system for welding abutting component tube sections to fabricate the necessary long lengths is required. Such butt welds must be nonporous, and of substantial mechanical strength.

As a further prerequisite for many applications of commercial interest, the inside and outside diameters of the welded joint must not vary appreciably from the dimensions of the tube itself. For example, a pronounced welding bead inside the joint will produce turbulence in the liquid flow therein. When a corrosive fluid is conveyed, this irregular liquid flow wears away the tube about the joint area.

Variations in the outside diameter of the weld from the nominal tube dimension often interfere with the mechanical mounting of the long tube lengths. Typically, such tubing must fit through a plurality of aligned apertures contained in corresponding positions in parallel, chamber-defining baffle plates of a heat exchanger or the like. Such apertures are normally just larger in size than the outer tubing diameter. If the welded joint is too large, the joined tube will not fit through the baffle apertures. If a joint is undersize its mechanical strength will be reduced.

However, a composite welding system for fabricating strong, nonporous butt welds with close diameter tolerances has heretofore not been available.

It is therefore an object of the present invention to provide an improved butt welding system.

More specifically, it is an object of the present invention to provide an automated butt welding system which effects at low cost strong, nonporous joints on tubes with thin walls while maintaining close diameter tolerances. Moreover, such welds may be accomplished under job site conditions.

These and other objects of the present invention are realized in a specific illustrative automated welding system employing axially aligned, orbiting welding and grinding arrangements. Abutting ends of two metallic tube sections to be fastened are urged together beneath a tungsten electrode in an inert gas environment by a cam-spring biased chucking apparatus.

The welding arrangement includes the tungsten electrode with a concentric inert gas containing jacket therearound, a motor driven cold filler wire feeding organization, and a tube positioning indexing arm. All of the foregoing structure is affixed to a rotating support plate for orbiting about the stationary tube ends in a reciprocating manner. During such rotation, welding current of a characteristic wave shape and a filler wire are supplied to the joint area.

After the weld has been completed, the newly formed joint is axially traversed to lie beneath the grinding arrangement which includes a pneumatically driven grinding wheel. The grinder orbits about the stationary tube joint, and removes the superfluous weld flashing head subject to the limiting action of a mechanical guide which maintains contact with the tube.

A complete understanding of the present invention and of the above and other objects, features, and advantages thereof may be gained from a consideration of the following detailed description of an illustrative embodiment thereof presented hereinbelow in conjunction with the accompanying drawing in which:

FIG. 1 is a block diagram of a composite butt welding and grinding system embodying the principles of the present invention;

FIG. 2 illustrates a welding unit 20 included in the arrangement of FIG. 1;

FIG. 5 illustrates a grinding unit 60 shown in block form in FIG. 1;

Figure 4:
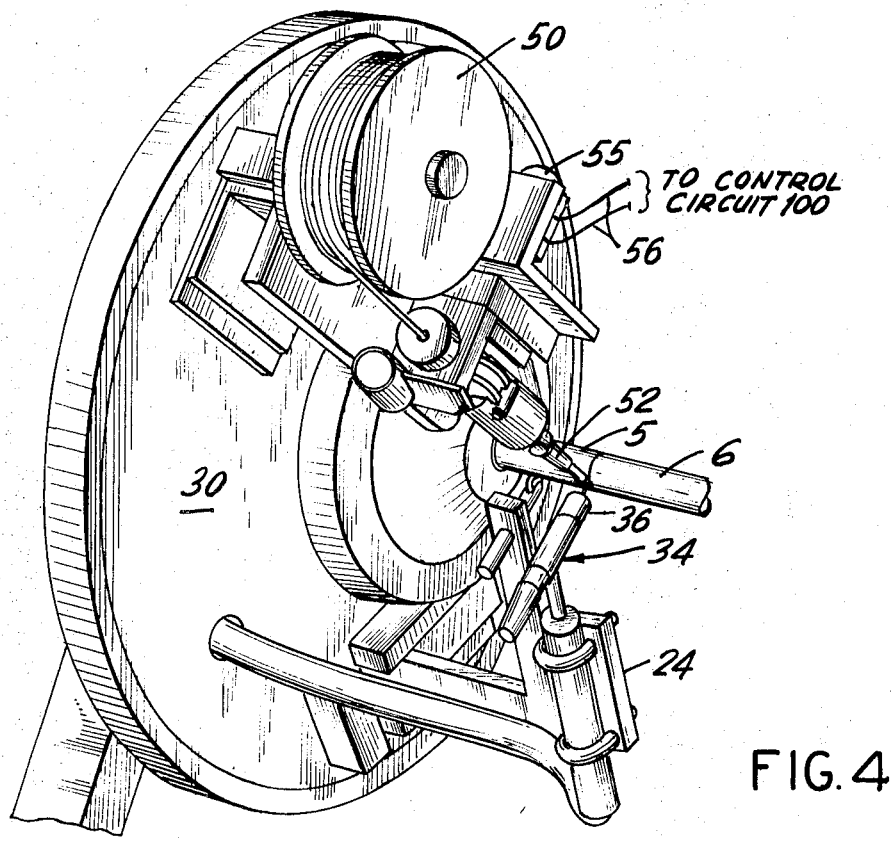
FIG. 4 depicts in detail a cold filler wire feeding arrangement shown in FIG. 2.

FIGS. 6A and 6B respectively comprise the top and bottom portions of a schematic diagram of a circuit arrangement for automatically effecting system functioning for the FIG. 1 organization; and FIGS. 7A through 7I are timing diagrams depicting illustrative system sequencing for the arrangement of FIG. 1.

SYSTEM ORGANIZATION

Referring now to FIG. 1, there is illustrated in block form a composite welding system which includes axially aligned welding and grinding units 20 and 60 respectively secured to a main housing 11 via frames 21 and 22, and 61, 62 and 63. Two metallic tubes 5 and 6 to be joined translate through the units 20 and 60 along a common tubing axis, with abutting ends of the elements 5 and 6 meeting within the welder 20.

The metallic tubes may comprise, for example, coppermetal compositions such as copper-nickel alloys, but is not limited thereto. Metallic tubes of many other compositions such as the steels, stainless steels, titanium and aluminum alloys may be joined by this process.

A control circuit 100 is employed to actuate automatically the welder 20, and the grinder 60, and to regulate the flow of water coolant, inert gas, welding current, compressed air, and motor actuating potential thereto. A direct potential source 19 selectively supplies the welding current 16 to the torch 34 in the unit 20 and power for bidirectionally rotating the orbiting structures included in the welding unit 20 and grinding unit 60.

Source of high velocity and low velocity inert gas 15 and 13 are selectively operable by the control circuit 100 for supplying an inert gas such as argon or helium to the remote end of the metallic tube 6, and also to the tungsten torch 34 included in the welding unit 20. Similarly a water source 18 operable under the control circuit 100 supplies coolant to the torch 34. A compressed air source 17 is operable to drive a pneumatic grinding wheel 65 in the grinding unit 60. The identity of the particular wires and piping interconnecting the several sources, the control circuit 100, and the units 20 and 60 is found in FIGS. 6A and 6B with like reference numerals being employed throughout the drawing to identify the same structural element. Finally, a weld cycle initiating switch 105 and a corresponding grinding cycle initiating switch 106 are mounted on the main housing 11 and connected to actuate the control circuit 100.

The welding unit 20 is shown in FIG. 2 and includes a tube holding stationary chuck 42 affixed to the left frame 22 mounted on the main housing 11. A rotatable welding apparatus supporting plate 30 is mounted for rotation about the chuck 42 by a roller bearing or the like (not shown in the drawing). A motor 40 is affixed to the left frame 22, and coupled by a suitable linkage 38 such as gear or the like to rotate the plate 30 about the stationary chuck 42. More specifically, when two input leads 41 attached to the motor 40 are energized with a direct potential in the polarity shown in FIG. 2 by the potential source 19 and the control circuit 100, the motor rotates the plate 30 through a clockwise welding cycle, as this direction is viewed from the front (right) of the plate 30. Conversely, the motor 40 rotates the plate 30 in a resetting counter-clockwise direction when the motor leads 41 are energized with a direct potential of a polarity opposite to the markings in FIG. 2.

Figure 3:
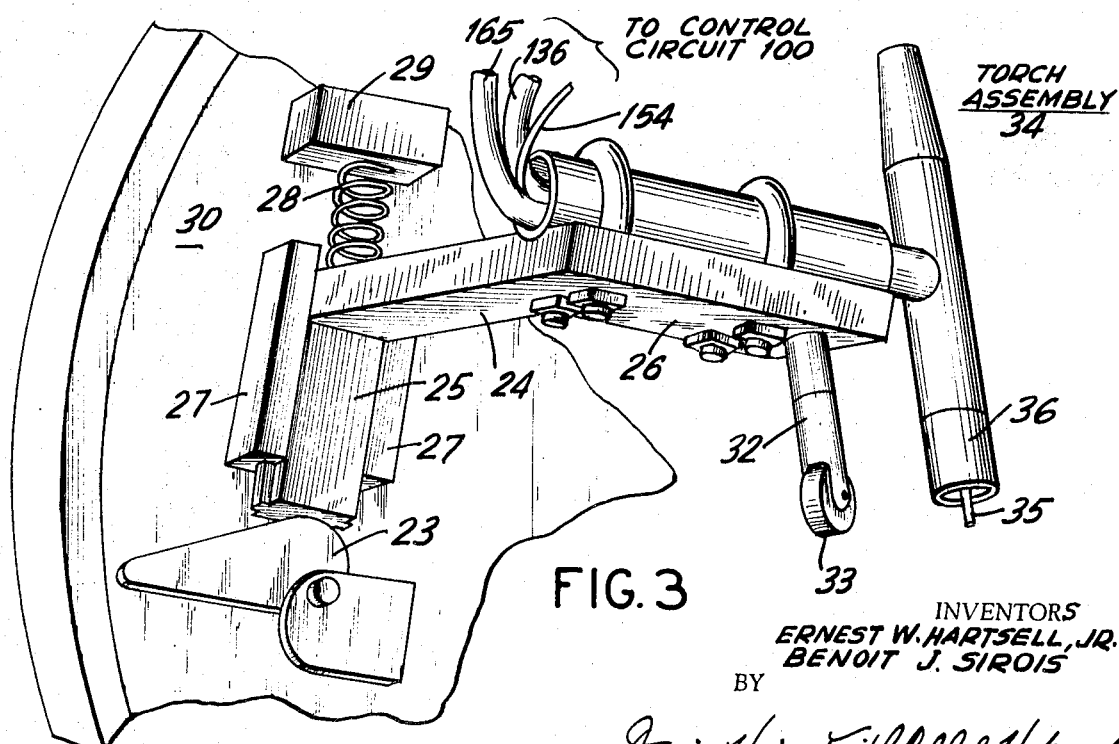
FIG. 3 illustrates in detail welding torch apparatus shown in FIG. 2.

Mounted on the plate 30 is a torch assembly 34 more particularly shown in FIG. 3. The assembly 34 comprises a tungsten inert gas torch mounted on an arm 24 having a first end portion 25 slidably mounted in a channel 27 which is attached to the plate 30. The arm end portion 25 is biased by a spring 28 away from a block 29 fixed to the plate 30, and selectively urged against the spring by a rotatable pivoting cam 23.

The other end portion 26 of the arm 24 has affixed thereto a guide 32 terminating at a roller bearing 33. The guide 32 is advantageously made adjustable in length, for example, by employing sliding telescoped body members having an overlap which is adjustably secured by a set screw. As will become more clear from the following, the length of the guide and roller 32–33 determines and holds constant the welding arc gap.

Also attached to the arm end 26 is an electrode 35 having therearound a water cooling passageway (not shown in the drawing for purposes of clarity), and a concentric jacket 36 for directing the inert gas to the exterior weld area. Connected to the electrode 35 is a conductor 154 for supplying welding current thereto from the source 16. Also connected to the torch are conduits 136 and 165 for respectively supplying low pressure inert gas and water.

When the tube 5 to be welded is inserted in the chuck 42 (see FIG. 2) the cam 23 is rotated to engage the arm portion 25, hence translating the entire torch assembly away from the work piece against the action of the spring 28. Prior to initiating the welding cycle, the cam 23 is rotated away from the arm portion 25. Accordingly, throughout the welding cycle when the composite welding apparatus is rotated by the plate 30, the guide roller 33 is mechanically biased by the spring 28 acting through the arm 24 to retain contact with the metallic tube 5. The end of the electrode 35 is mechanically fixed against motion relative to the guide roller 33, and therefore maintains a fixed spacing from the abutting ends of the tubes 5 and 6 for the duration of the welding cycle. This constant welding gap plus other features described herein gives rise to a homogeneous weld joint as the electrode 35 rotates about the joint area.

An indexing arm 45 is pivotally mounted on the plate 30 by a pin 46. The indexing arm 45 has a face 48 which is adapted to stop the end of the metallic tube 5 just beneath the welding electrode 35 when the tube is inserted and fastened in the chuck 42. After the work piece 5 is secured, the arm 45 is rotated away from the work piece, and effects no further system function.

There is also affixed to the plate 30 a cold filler wire feeding arrangement shown in detail FIG. 4 for supplying cold filler wire to aid the welding process. The arrangement includes a spool 50 which supplies filler wire via a guide 52 to the joint area, preferably at an angle of approximately eighty degrees with respect to the torch electrode 35 but not necessarily restricted thereto. A motor 55, activated by a potential supplied to two leads 56 thereon by the control circuit 100, is selectively adapted to pay out the wire from the spool 50 through the guide 52. This is accomplished, for example, by interposing a pulley driven by the motor 55 between the spool 50 and the guide 52 to apply frictionally a driving force to the wire.

Finally, the welding unit 20 of FIG. 2 includes a spring biased chuck 43 for securing the right metallic tube 6, and for urging the tubes 5 and 6 together. The chuck 43 is attached to a frame member 57 which is mounted in a sliding relationship atop the right welding unit frame 21 under the action of a spring 58 and a rotatable cam 59.

A tube mounting operation is effected by first securing the left tube 5 in the chuck 42 such that the tube end is disposed directly beneath the electrode 35 under guidance of the indexing arm 45. The right metallic tube 6 is then placed in the chuck 43 until it abuts the tube 5 at which point the chuck 43 is tightened. The cam 59 is then rotated to bias the ends of the tubes 5 and 6 together under the force of the spring 58 acting through the slidable frame member 57 and the chuck 43.

The grinding arrangement 60 is shown in detail in FIG. 5 and includes two chucks 64 and 66 for securing the tube having a weld therein in place. The chucks 64 and 66 are respectively secured to the main housing 11 via frame elements 63 and 61. A grinding apparatus supporting plate 67 is rotatably mounted in the frame member 62 by roller bearing or the like. A motor 70 is attached to the frame 63 and cooperates with a suitable coupling 74 such as gears or the like for rotating the plate 67 in a reciprocating manner. More specifically, the motor 70 will rotate the plate 67 in a counter-clockwise or a clockwise direction (when viewed from the right in FIG. 5) when two motor leads 71 thereon are energized by the control circuit 100 and the potential source 19 with a potential of a polarity which is the same, or which is opposite to the polarity markings in the drawing.

An arm 72 is affixed to the grinding plate 67 and has an adjustable clamp 73 on one end thereof. Included in the clamp 73 is a spring linkage 75 which urges a block 69 radially inward towards the metallic tubing. A grinding wheel 65 is rotatably mounted on the block 69 and adapted to translate radially with the block. Also affixed to the block 69 is a pneumatic motor 80 for driving the grinding wheel 65. The motor 80 is selectively supplied with compressed air by the control circuit 100 and a compressed air source 17 by way of the conduit 196.

Also affixed to the block 69 is a guide block 82, which contains a ball bearing (not shown) adapted to selectively contact the tubing 5 to the left of the weld area. During the grinding operative cycle, the grinding wheel 65 removes the external flashing bead under the urging of the spring 75 acting against the block 69.

The base of the guide block 82 contains a ball bearing, not shown, which contacts the tube 5 when the excess weld bead has been removed by the grinder to a predetermined depth without grinding into the tube surface. When the bead is removed, such that the periphery of the wheel 65 becomes level with the nominal tube outer surface, the bearing in block 82 contacts the tube to prevent further metal removal. Accordingly, the block 69 and the grinding wheel 65 are prevented from any further radially inward movement. Hence, as the grinding wheel 65 is orbited about the welded joint by the rotating plate 67, the external flashing bead portion having a diameter greater than the nominal outer tube dimension is uniformly removed. The finished weld joint therefore has an outer dimension which is advantageously the same as that of the tubes 5–6.

The control circuit 100 and the fluid, gas and electric sources governed thereby are shown in FIGS. 6A and 6B. In this composite drawing, relay contacts are shown in detached form with an x or a vertical bar respectively representing normally open and normally closed contact pairs. The control circuit 100 includes a potential source 102 selectively connected to a welding bus 109 and a grinding bus 175 by the welding 105 and grinding 106 cycle actuating switches mounted on the main housing 11.

When the welding switch 105 is closed, the potential supplied by the source 102 is applied to the bus 109. A normally open motor driven timing switch 108 is adapted to close immediately and connect this potential across a relay winding 110, thereby closing contacts 111 associated therewith. The closed contacts 111 perform a latching function, that is, they maintain the connection between the source 102 and the bus 109 after the switch 105 has been released. The switch closure interval for the variable timer switch 108 is set to continuously energize the winding 110 for the full duration of the welding cycle, i.e., during the period between the times $a$ and $l$ shown in FIG. 7A. After the time $l$, the timer 108 returns to its normally open state, thereby opening the contacts 111 and deenergizing the welding bus 109.

The potential impressed on the welding bus 109 gives rise to several system functions. A timer switch 113 connects this potential across a relay winding 115 for the interval $a$–$b$ shown in FIG. 7B hence opening a normally closed valve 116. Accordingly, high velocity inert gas is conveyed from the source 15 thereof to the remote end of the tube 6 via pipes 121 and 123 and a T-connection 119. Similarly, a timer switch 125 energizes the three parallel valve solenoid windings 129, 134 and 162 for the interval $a$–$k$ shown in FIG. 7C. Three corresponding valves 130, 135 and 163 thereby open for this period. The enabled valves 130 and 135 respectively supply low pressure inert atmosphere sustaining gas from the source 13 to the remote end of the tube 6 through pipes 127 and 123 and the T-connection 119, and also to the torch 34 between the electrode 35 and the jacket 36 through a pipe 136. The valve 163 opened by the winding 162 supplies water coolant from the source 18 to the coolant passageway in the torch 34 by way of pipes 164 and 165.

Normally closed and normally open timing switches 149 and 150 energize a relay winding 152 during the interval $c$–$h$ in FIG. 7D. In particular, a connection between the bus 109 and the winding 152 is completed in the interval after the time $c$ when the adjustably timed switch 149 is reset to its normally closed state and before the time $h$ when the switch 150 times out to return to its normally open state.

A signal identifying the interval $c$–$h$ is communicated by closed contacts 153 associated with the relay winding 152 to the welding current source 16. The source 16 may illustratively be embodied by any conventional welding current source with an attendant slope control unit. The arrangement 16 responds to the contact closure by first supplying a high frequency alternating potential shown as wave shape 200 in FIG. 7D to the welding electrode 35 to initiate an arc between the electrode and the metallic tubes 5 and 6. The welding current supplied by the source 16 is of a form depicted by the wave shape 210 in FIG. 7D. In particular, the waveform 210 has an initial rising slope portion 211 terminating at the time $f$ a plateau portion 212 between the times $f$ and $h$, and a trailing declining slope 213 beginning at the time $h$. The duration of the leading and trailing wave shape portions 211 and 213 is exaggerated in FIG. 7D for purposes of clarity, and actually takes only a portion of a second, while the plateau portion 212 persists for several seconds while the electrode 35 rotates about the joint area. The rate of current increase and decrease, and the amplitude of the plateau, may be regulated by controls typically found on existing welding current source 16.

Two timers 137 and 139 energize a relay winding 140 during the time interval $d$–$i$ of FIG. 7E, thereby supplying potential from the source 19 to the welding orbiting motor 40 via leads 144, the contacts 141–1 and 141–2, and the leads 41. The polarity of the potential causes the motor 40 to rotate the plate 30 in a clockwise direction about the metal tubes 5–6 while the welding is actually being effected. Following this interval, two timing switches 143 and 147 energize a winding 145 during the interval $j$–$l$ of FIG. 7E thus closing the contacts 146–1 and 146–2. Such action supplies the motor 40 with an inverse voltage of a polarity which resets the welding plate fixture 30 to its initial state after a counterclockwise rotation thereof.

Two clock timers 155 and 156 are included in the control circuit 100 to energize a relay winding 157, which actuates a contact pair 158, during the interval $e$–$h$ of FIG. 7F, thereby completing a circuit from the source 19 through the leads 56 to actuate the cold wire feed motor 55. Accordingly, wire is continuously supplied to the joint area during this portion of the active welding cycle.

Finally, the potential on the welding bus 109 acts through timers 161 and 166 and a winding 167 to actuate a contact pair 168 connected in parallel with a resistor 169 during the time interval $g$–$i$ of FIG. 7E. The resistor 169 is connected in series with the field winding of the motor 40. The plate 30 is driven relatively slowly by the motor 40 when the resistor 169 is not short circuited by the contacts 168, as indicated in FIG. 7E for the period $d$–$g$, since a portion of the bus potential is dissipated by the resistor 169 and hence not dropped by inductive reaction across the motor 40. During the period $d$–$g$ the joint area has not attained maximum operating temperature. When such peak temperature is attained, viz., at or near the time $g$, the plate fixture 30 is rotated more rapidly in response to the shorting out of the resistor 169 to prevent excessive penetration of the welding arc into the tubes 5 and 6. Without this precaution, the resulting joint would be heterogeneous, both as to joint strength and also regarding the amount of attendant internal weld bead.

The joint grinding portion of the composite welding cycle is actuated by depressing the grinder switch 106 on the main housing 11, thereby temporarily applying potential from the source 102 on the grinding bus 175. A clock switch 172 energizes the winding 173 hence closing a relay contact pair 174 in parallel with the switch 106 for the duration of the welding cycle, i.e., for the period $m$–$o$ shown in FIG. 7G. The interval $m$–$o$ is compressed in the drawing, and is approximately equal to the period $d$–$i$ of FIG. 7E. Two relay windings 178 and 185, along with their associated contacts 179–1 and 179–2, and 186–1 and 186–2, and timer switches 177, 183 and 184, give rise to the grinder plate 67 reciprocating orbit shown in FIG. 7H. More specifically, a potential of the polarity shown in FIG. 5 causes the motor 70 to drive the grinder system support plate 67 in a counterclockwise direction during the time interval $m$–$n$ of FIG. 7H. An opposite potential gives rise to a reverse, resetting rotation between the times $n$ and $o$.

Finally, a timer switch 191 selectively energizes a winding 192 coupled to a valve 193 to control the flow of compressed air from the source 17 thereof to the pneumatic grinder motor 80 by way of conduit 196. In particular, the grinding motor 80 is driven during the welding cycle interval $m$–$n$ of FIG. 7I.

SYSTEM OPERATION

With the above-described structure in mind, an illustrative sequence of operation for a complete joint fabricating cycle will now be considered. The left metallic tube 5 is inserted through the two grinding chucks 64 and 66, the center of the rotating plate 67 and the left welding unit chuck 42 until the end of the member 5 lies beneath the welding electrode 35 under control of the arm 45. The tube 5 is secured in this position by fastening the chuck 42, and the indexing arm 45 is rotated away from the joint area.

With the cam 59 in a relaxed downward position, the right tube 6 is inserted through the chuck 43 and moved to the left until it abuts the end of the tube 5 whereupon it is secured within the chuck 43. The cam 59 is rotated upward to continuously urge the contiguous ends of the two tubes 5 and 6 together under positive pressure produced by the constricted spring 58.

An operator then presses the weld button 105 on the main housing 11 which cooperates with the relay 110–111 to latch the potential of the source 102 on the welding bus 109 during the time interval $a-l$ (FIG. 7A). The valve 116 immediately opens to supply inert gas under a relatively high velocity to the remote or right end of the tube 6. A period $a-b$ for supplying the high velocity gas (FIG. 7B) is adjusted by a proper setting of the timer 113 to allow the gas to transverse the length of the tube 6 such that the internal weld area is purged of air and substantially comprises an inert gas environment.

Also, valves 130 and 135 are opened during the interval $a-k$ of FIG. 7C to supply low velocity gas to the welding torch 34 about the electrode 35, and also to the end of the tube 6, to maintain the inert gas welding atmosphere for the duration of the welding cycle. It is observed that the gas supply is maintained after the welding current is removed from the electrode 35 (compare FIGS. 7C and 7D). Accordingly, the electrode 35 and the newly welded joint cool in an inert environment and therefore do not oxidize. Such oxidation would greatly shorten the life of the electrode 35, and would render the joint brittle. Further at the time $a$, the valve 163 opens to supply water coolant from the source 18 to the torch 34 until the time $k$ of FIG. 7C.

At the time $c$ of FIG. 7D, the welding current source 16 supplies the high frequency oscillation which very quickly gives rise to the unipolar welding current arc depicted by the wave shape 210 between the electrode 35 and the tube ends responsive to a closure of the contacts 153. The welding current builds up rapidly to its plateau value.

As the welding current increases, i.e., during the slope portion 211 of FIG. 7D, the contacts 144–1 and 144–2 impress a potential on the motor 40 initiating a clockwise rotation of the welding plate 30 about the tubes 5–6 About this time also, the motor 55 FIG. 4 is energized by the source 19 to supply filler wire from the spool 50 to the joint area through the guide 52.

The speed of the motor 40 is increased at the time $g$ of FIG. 7E to maintain a constant depth of welding after the temperature of the electrode and the tube joint area have reached their peak value. The variable speed of the motor 40 is adjusted such that the welding plate 30 with its attendant torch and cold wire feed assemblies traverses the entire circumference of the joint area with a small overlap during the time interval $e-h$ of FIG. 7F. At the time $h$, the cold wire feed stops and the contacts 153 open circuit thereby starting the welding current down slope. The gradual decrease of the welding current indicated by the slope 213 of FIG. 7D cooperating with the inert gas invironment prevents electrode and joint oxidation as noted above. Also such coaction inhibits the formation of any crater or depressed welding area during the overlapping traversal of the welding electrode about a previously welded joint portion. It is observed that throughout the rotation of the plate 30, the guide roller 33 maintains contact with the tube 5 under urging of the spring 28. As the guide 33 and the electrode 35 are fixed against any relative movement, the tip of the electrode 35 thus maintains a fixed welding arc gap which further assures a homogeneous weld.

Finally, during the interval $j-l$ of FIG. 7E, the motor 40 returns the plate 30 to its initial position through a counter-clockwise rotation responsive to the closing of the contacts 146–1 and 146–2. Following the time $l$, the latching contacts 111 open thereby de-energizing the welding bus 109. At this point in system functioning, a strong, nonporous butt weld with a relatively small amount of internal bead secures the tubes 5 and 6. The weld joint also has an external bead which projects above the outer diameter of the tubes 5–6.

An operator opens all chucks, releases cam 59 and engages cam 23. The engagement of cam 23 moves both the guide wheel 33 and the electrode 35 away from the welded tubes, thus preventing damage to these two components as the tube joint is moved from right to left. The welded joint is traversed to the left to lie directly beneath the grinding wheel 65 and the tube is secured by tightening the grinding chucks 64 and 66. The clamp 73 is closed to spring bias the periphery of the grinding wheel 65 against the external joint bead, and to also urge the guide block 82 toward the tube 5.

The operator next depresses the grinding cycle initiating switch 106 on the frame 11 thereby latching potential on the grinding bus 175 through the action of the relay 173–174. This is assumed to occur for the time interval $m-o$ of FIG. 7G. The valve 193 immediately opens at time $m$ to supply compressed air to the motor 80 which rapidly rotates the grinding wheel 65. The contact 179–1 and 179–2 close causing the motor 70 to rotate the grinding support plate 67, along with its attendant assemblies, in a clockwise direction. As the grinding wheel rotates about the joint, the wheel 65 continuously removes weld metal until the bottom of the bearing in the guide block 82 contacts the rod 5. This bearing then inhibits any further radially inward movement of the wheel 65. Accordingly, the orbiting grinding wheel 65 continuously generates a weld joint periphery whose diameter is the same as the nominal outer diameter of the tubes 5 and 6.

The orbiting plate 67 is adapted to make slightly more than one revolution about the weld during the interval $m-n$ of FIG. 7H under control of the timer switch 177. After the time $n$ of FIG. 7I, the valve 193 closes and the orbiting motor 70 reverses direction (FIG. 7H) responsive to the opening of the contacts 179–1 and 179–2 and the closing of the contacts 186–1 and 186–2. During the following period $n-o$ (FIG. 7H), the grinding plate 67 is rotated in a clockwise direction to return to its initial position. At the time $o$ the functional grinding cycle is completed, and the potential latching contacts 174 open circuit responsive to the action of the timer 172 thereby de-energizing the grinding bus 175.

An operator then releases the clamp 73 and opens the chucks 64 and 66. The tubes 5 and 6 now joined by a butt weld characterized by a regular outer dimension may be removed for use. Alternatively, a further tube section may be added thereto, for example, by sliding the joined tubes 5–6 to the left such that the right end of tube 6 is positioned beneath the welding electrode 35 under guidance of the indexing arm 45. A new section of tube may then be joined thereto in the manner disclosed above.

Accordingly, the welding system considered herein has been shown by the above to fabricate metallic tubes of any predetermined long length by joining shorter lengths in a relatively simple, automated and reliable manner. Such tube includes contiguous tube sections joined by strong, nonporous, homogeneous butt welds having a regular outer diameter, and a relatively small internal bead.

The above-described arrangement is only illustrative of the application of the principles of the present invention. Numerous other arrangements and modifications thereof may be devised by those skilled in the art without departing from the spirit and scope of the present invention.

What is claimed is:

1. In combination in a welding system, means for securing two sections of metallic tubes in an end abutting relationship along a tube axis, welding means including plate means mounted for rotation about said axis, torch means including an electrode mounted on said plate means, means for bidirectionally rotating said plate means, a first potential source, a source of inert gas, a welding current source, and a control circuit, said circuit comprising an additional potential source, a conductor, latching switch means for connecting said additional potential source to said conductor for a predetermined time interval, means for selectively enabling said latching switch means, first timed switch means responsive to a potential on said conductor for connecting said gas source to an end of one tube section and to said torch means, second timed switch means responsive to a potential on said conductor for sequentially actuating said plate rotating means with said first potential source for alternately rotating said plate in a first and second direction, third timed switch means responsive to a potential on said conductor for connecting said current source with said torch means, grinding means including grinding support plate means aligned with said tube axis and mounted for rotation thereabout, means for bidirectionally rotating said grinding plate means, a grinding wheel affixed to said grinding plate means, and wherein said control circuit further includes a grinding cycle conductor, additional latched switch means connecting said additional potential source with said grinding cycle conductor for a predetermined time interval, means for enabling said additional latched switch means, fourth additional timed switch means responsive to a potential on said grinding cycle bus for activating said grinding support plate rotating means.

2. A combination as in claim 1 wherein said welding means further includes a guide mechanically fixed to said electrode, biasing means for urging said guide toward said tube axis, and means for feeding cold filler wire toward said tube axis in proximity to said electrode, said wire feeding means being mechanically fixed to said electrode and adapted to be rotated therewith by said electrode rotating means.

3. A combination as in claim 2 wherein said grinding means further includes guide means biased by said selective urging means towards said tube axis, said guide means including means for selectively inhibiting radial translation of said grinding wheel toward said tube axis.

4. A combination as in claim 3 further comprising a source of relatively low velocity inert gas, wherein said control source includes additional timed valve means for selectively conveying gas from said low velocity source about said welding electrode and also to the tubing operated upon by said welding means.

5. A combination as in claim 4 wherein said welding current supplied by said current source is of a trapezoidal wave shape, and wherein said control means includes means for constraining said relatively low velocity inert gas source means to supply said inert gas for an interval after said current supplied by said welding current source terminates.

6. A combination as in claim 4 wherein said control means includes means for selectively energizing said cold wire feeding means.

7. A combination as in claim 1 further comprising means for rotating said grinding wheel, and wherein said control circuit further includes fifth additional timed switch means for energizing said wheel rotating means.

8. A combination as in claim 7 wherein said source means includes a source of compressed air, said grinding means includes a pneumatic motor for rotating said grinding wheel, and said control means includes means for selectively connecting said grinding wheel motor with said source of compressed air.

9. A combination as in claim 8 wherein said control means includes means for actuating said grinding wheel rotating means in a first direction for a predetermined time interval, and for orbiting said grinding wheel in an opposite direction during a subsequent time interval.

References Cited
UNITED STATES PATENTS

| | | | |
|---|---|---|---|
| 2,979,598 | 4/1961 | Laslo | 219—60 |
| 3,042,787 | 7/1962 | Kotecki | 219—60 |
| 3,084,244 | 4/1963 | Rieppel et al. | 219—60 |

FOREIGN PATENTS

| | | |
|---|---|---|
| 1,129,860 | 5/1962 | Germany. |

JOSEPH V. TRUHE, Primary Examiner

H. D. JAEGER, Assistant Examiner

U.S. Cl. X.R.
51—90; 219—101